UNITED STATES PATENT OFFICE.

JOHN UNWIN, OF SHEFFIELD, GREAT BRITAIN.

IMPROVEMENT IN ETCHING ON GLASS.

Specification forming part of Letters Patent No. 205,446, dated June 25, 1878; application filed May 6, 1878.

*To all whom it may concern:*

Be it known that I, JOHN UNWIN, of Sheffield, in the county of York, in the Kingdom of Great Britain and Ireland, have invented certain new and useful Improvements in the Process of and Means for Etching on Glass, of which the following is a specification:

This invention consists in the application or use of flexible molds or blocks for etching or printing or producing designs on glass. These blocks or molds are composed of certain proportions of glue and treacle, or india-rubber, or gutta-percha, or any other suitable material or composition that will make an elastic or flexible mold, such as is in common use for printing purposes made from wood block and stereos.

The glass, after being made perfectly clean, is caused to receive an impression from the flexible mold, such mold having been first covered with a suitable ink or adhesive matter. If the common ordinary printing-ink be used, it will be necessary, when the impression has been conveyed to and deposited upon the glass, to cover such impression with powdered resin, and next to submit it to the action of fire, which will cause the resin to become melted or incorporated into the impression made with the ink. This done, and the impression having become perfectly set and dried, the surface of the glass must be wiped very clean, and the back and other parts not intended to be etched must be varnished completely over, to preserve them from the effects of the etching-solution, so that only that portion intended to be acted upon shall come in contact with the biting or etching properties of the solution. The glass is then ready for the bath or solution of acid, such as is regularly used for the purpose of etching or biting in the impression or figure required upon the glass. The solution or bath which I use is contained in a tank made of wood and lined with lead, and is prepared by well mixing together equal weights of fluoric acid and of common soda-ash with about six times the combined weight of water until the soda is properly dissolved. These proportions are very serviceable, but they may be altered a little in working.

The length of time the glass should remain in the bath may vary in proportion to the strength of the solution and the amount of deadening and biting effect required upon the glass. After the latter is taken out of the bath it should be washed with clean cold water, and afterward cleaned with potash or soda and water.

Having now described the nature and object of my said invention, together with the manner in which the same is to be performed or carried into practical effect, I wish it to be clearly understood that I do not claim the use of flexible molds, which have long been in use for impressing figures and designs upon china, earthenware, glass, and other articles of this nature; neither do I claim the etching with fluoric acid and soda, which are well-known articles, and have been used for such purposes for a considerable time; but I would remark, in conclusion, that

What I claim as my invention is—

The process of producing etched designs on the surface of glass by printing them directly from flexible molds in ordinary ink, and applying powdered resin to the printed parts, and producing the etched and all deadened effects at one operation by the agency of fluoric acid and soda-ash, substantially as hereinbefore described, the same being cheaper and more quickly effected than by the process of transferring prints from steel, copper, metal, or stone plates, as in previous methods used for the purpose of etching on glass.

In testimony whereof I have signed my name to this specification in the presence of two subscribing witnesses.

JOHN UNWIN.

Witnesses:
 W. E. TATTERSHALL,
  *Solicitor and Notary, Sheffield.*
 RICHARD COOK,
  *St. James Street, Sheffield.*